Figure 1:
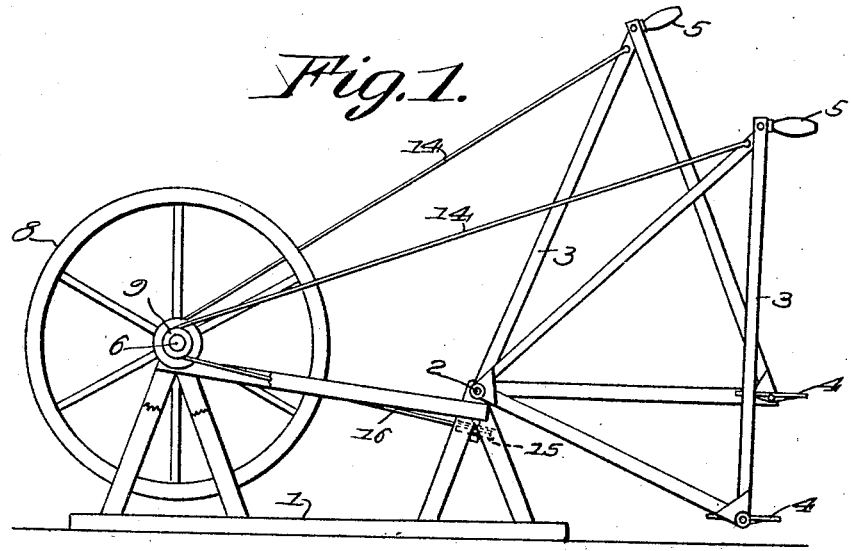
Figure 2:
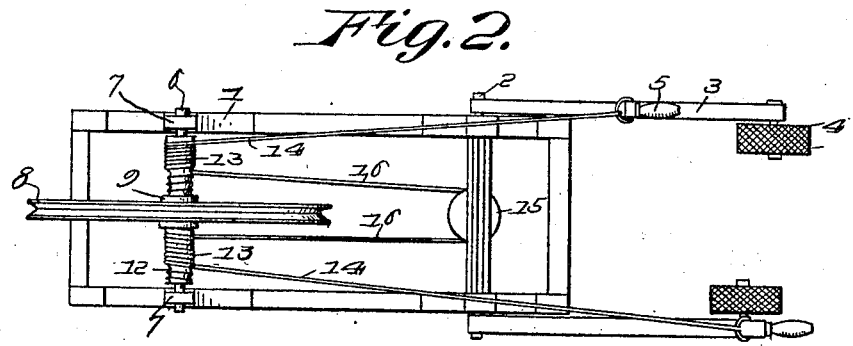
Figure 3:
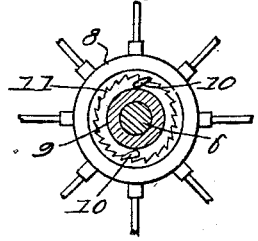
Figure 4:
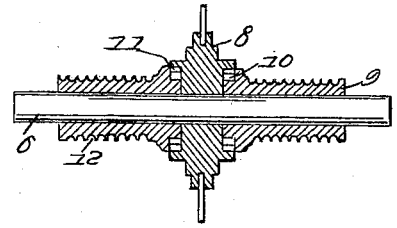

Feb. 24, 1925.
E. HADDAD
MOTOR
Filed Jan. 26, 1921
1,527,254
2 Sheets-Sheet 1

Inventor
E. Haddad,
By Marks & Clerk
Attorneys

Feb. 24, 1925.
E. HADDAD
MOTOR
Filed Jan. 26, 1921
1,527,254
2 Sheets-Sheet 2
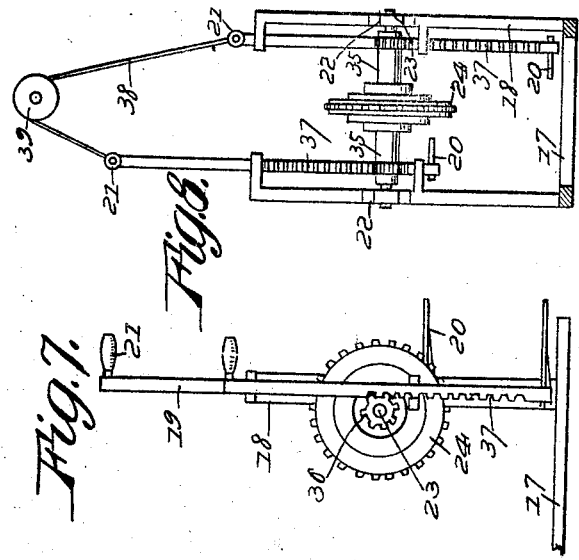
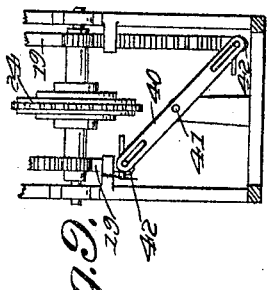
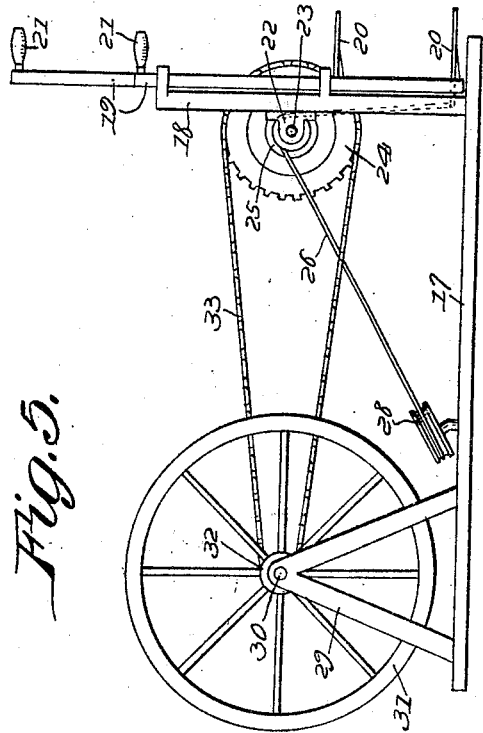
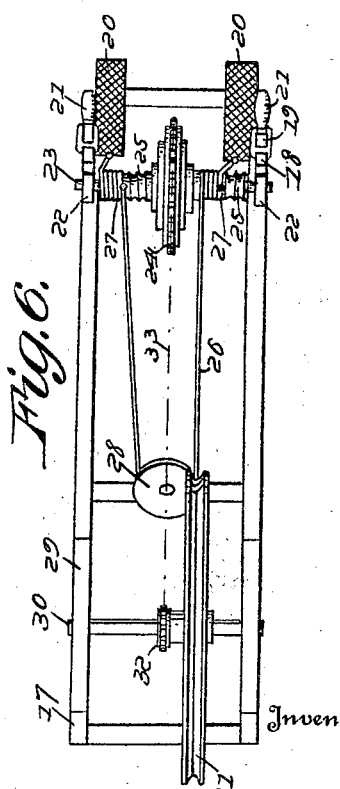
Inventor
E. Haddad,
By Marks & Clerk
(Attorneys)

Patented Feb. 24, 1925.

1,527,254

UNITED STATES PATENT OFFICE.

ELIAS HADDAD, OF BUENOS AIRES, ARGENTINA.

MOTOR.

Application filed January 26, 1921. Serial No. 440,199.

*To all whom it may concern:*

Be it known that I, ELIAS HADDAD, a citizen of Arabia, residing at Buenos Aires, Argentine Republic, have invented certain new and useful Improvements in Motors, of which the following is a specification.

The present invention relates to an apparatus which allows human muscular force to be utilized, and it has for its object to provide an apparatus with which to obtain motive power by the rational and thorough use of human muscular strength. The advantages possessed by this apparatus over the levers and pedals of a bicycle are self-evident, if it be considered that the levers only bring into play the strength of the arms, abdomen and back, as the legs only serve as a support: and that the pedals are only worked by the strength of the legs: whilst the apparatus which is the object of this invention calls into action the principal muscles of the whole body.

The weight of the body, which has acted on one of the balance-bars, must be overcome by the muscular effort of the body, legs and arms, required to raise it, and which are supported by the other balance-bar. The tests which have been made prove that, by means of this apparatus, a man can develop more energy than has ever been obtained by any apparatus known hitherto; with less fatigue, and consequently, for a longer time.

The apparatus which is the object of this invention may be adapted to bicycles, launches, aeroplanes, &c.: in which case, the side-wheels may be replaced by a propeller. It may also be worked in a stationary position, for the purpose of producing motive power available for domestic purposes, the production of electrical energy, &c. For the purposes of physical culture, this apparatus is of great value.

So that the present invention may be clearly understood and put into practice, without any difficulty, we are showing it, by way of example, in some of its most popular forms, in the annexed drawings; in which:—

Figure (1) is the front view of one of the forms of the apparatus;

Figure (2) is a top plan of the same;

Figure (3) is a fragmentary detail view of the wheel and of the bushes: showing the ratchet arrangement;

Figure (4) is a longitudinal section, along the axis of the wheel;

Figure (5) is a front view of a modification of the apparatus;

Figure (6) is a top plan of the same;

Figure (7) is a fragmental front elevation of another variation;

Figure (8) is a fragmental side elevation of a further modification;

Figure (9) is a similar view of a further modification.

In all these figures, the same reference-figures apply to the same or to corresponding parts.

According to these figures, 1 is a framework, composed of a base and two beams, on which the axle, 2, is fixed by means of bearings: the balance-bars pivoting on this axle. These balance-bars, numbered 3, form a rigid triangle, in which the lower front angle is provided with a pedal, 4, while the upper angle is provided with a handle, 5.

At the other end of the framework, an axle, 6, supported by the bearings, 7, passes through, and is rigidly fixed to a fly-wheel, 8. At each side of the fly-wheel, there is a bushing, 9, provided, on the side next to the wheel, with two spring-pawls, 10, which engage the internal ratchet teeth, 11, of the wheel. These bushings are provided with a spiral groove, 12, onto which is rolled a cable, fixed at one point, to the bushing, by means of the bolt, 13. The cable goes, in one direction, from the bolt to the upper end of the balance-bar, as shown at 14: and in the other direction, it passes over a pulley, 15, and reaches the other bushing at a similar point: this part of the cable being marked 16.

It will be easily seen that by exercising pressure on one of the balance-bars, the cable attached to it is caused to unwind, and also causes the bushing to revolve, the pawl 10 of the latter engaging the ratchet teeth 11 and causing the fly wheel to revolve with it. By performing the same operation with the other balance-bar, a continuous movement of the fly-wheel is obtained. The cable is extended over the pulley 15 from one bushing to the other, for the purpose of causing one balance-bar to ascend as the other is depressed. When one end 14 of the cable of the balance-bar unrolls from its bushing, 9, the other end 14 rolls upon its bushing, causing the last mentioned bushing to revolve in a contrary direction and elevating the balance-bar.

Figures 5 and 6 show a variation of the present invention. The pivoted balance-bars shown in Fig. 1 are replaced by coulisse-bars, adjacent which is the axle which carries the bushings, and which is only provided with a pinion adapted by the use of a chain to transmit its movement to the fly-wheel, placed in front. This arrangement of the flywheel is necessary: because if it were placed on the same axis as the bushes, it would interfere with the movements of the operator of the apparatus. In this variation, 17 is the framework provided with two guiding-columns, 18, along which slide the bars, 19, each provided with a pedal, 20, and a handle, 21. On their opposite sides, the guiding-columns support the bearings, 22, of a horizontal axle, 23, which carries at its centre a rigidly mounted toothed wheel, 24. At each side of the toothed wheel there is a bushing 25 having a spiral groove therein. As in the oscillating-bar apparatus, the bushings are provided with pawls, which engage the ratchet teeth provided on the central wheel 24.

It is evident that any other of the known arrangements for obtaining a ratchet movement may be employed: and as its action, in the modified apparatus is identical with that in the apparatus first described, by way of example, the said ratchet arrangement has not been illustrated in detail in these drawings.

At the lower end of each coulisse-bar, the end of cable 26 is fixed, which is rolled onto the grooved bushings, and is fixed to point 27 thereof.

The cable goes from one bush to the other, passing over the pulley 28. All this arrangement is exactly the same as, and its action is identical with, the first-described apparatus.

At the other end of the framework, the bearings, 29, support the axle, 30, of a fly-wheel, 31, and pinion, 32, which forms part of the axle, and which is driven by wheel 24, through a chain, 33. It will easily be seen that, instead of toothed wheels and chains, pulleys and straps may be used.

Another variation consists in making the coulisse-bars act directly on the bushes, by means of racks and toothed wheels. In this case, the cables and grooved spirals on the bushings are done away with.

Figures 7, 8 and 9 illustrate this last variation, which only affects the front part of the machine: since the fly-wheel, which is moved by a chain, or a strap, as in the preceding case, does not undergo any modification.

The framework, 17, and the guiding-columns, 18, are the same as in the form of the invention shown in Figs. 5 and 6. The bars, 19, each provided with a pedal, 20, and a handle, 21, slide in the same manner. There are also the bearings, 22, sustained by the columns, and on which a horizontal axle, 23, revolves. In the centre of this axle, and rigidly fixed to it, is a toothed wheel, 24. At each side of the wheel, the axle carries a bushing, 35, provided with a ratchet arrangement (not shown in Figures 7, 8 and 9), which only allows the wheel to revolve in one direction. These bushings carry toothed wheels, 36, which mesh with the rack bars, 37, of each coulisse-bar.

For the purpose of raising the coulisse-bar which is in its lowest position, by means of the bar which is about to descend, there are various methods which are adaptable to this variation. One is shown in Figure 8, and consists of a cable, 38, the ends of which are attached to the coulisse-bars. This cable passes over a pulley, 39, and it will be seen that the descending bar draws up the other bar. Another method is shown in Figure 9. It consists of a balance-bar, 40, pivoted at point 41, situated between the two bars. At each end of the balance-bar, there is a slot which receives a pin, 42, fixed to the lower end of each bar.

In these variations, which include rack bars, the same as in the first variation, the movement of the central wheel is transmitted, by means of a chain, or a strap, to a fly-wheel situated at the other end of the framework.

It is evident that other modifications, as to construction and as to detail, may be introduced. The framework may be altered, or even dispensed with altogether, according to the requirements of the case. For instance, in the case of a bicycle, the framework of the bicycle, with some few modifications, replaces the framework above referred to.

Having thus specially described and determined the nature of the present invention, and the manner in which it should be put into practice, I declare that what I claim as my invention and exclusive right is the following:

In combination, a support, a shaft journaled in said support, a wheel carried by said shaft, bushings loosely mounted on said shaft on opposite sides of said wheel, clutch devices connecting the bushings with the wheel and adapted when oscillated to drive said wheel, substantially triangular frames pivotally mounted on the support, a flexible member having its ends connected with the respective triangular frames, a guide pulley rotatably mounted on said support adjacent the pivotal mounting of the triangular frames and movably supporting the medial portion of the flexible member, the portions of the flexible member lying intermediate the pulley and the triangular frame being trained over said bushings, and operating members carried by the upper and lower extremities of the triangular frames.

In testimony whereof I affix my signature.

ELIAS HADDAD.